(12) United States Patent
Okamura

(10) Patent No.: US 6,690,775 B2
(45) Date of Patent: Feb. 10, 2004

(54) DELIVERY-INFORMATION MANAGEMENT METHOD AND DELIVERY-INFORMATION MANAGEMENT PROGRAM

(75) Inventor: Michio Okamura, Kawaski (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/364,455

(22) Filed: Feb. 12, 2003

(65) Prior Publication Data

US 2004/0008830 A1 Jan. 15, 2004

(30) Foreign Application Priority Data

Jul. 12, 2002 (JP) .................................... 2002-203682

(51) Int. Cl.⁷ ............................................ H04M 11/00
(52) U.S. Cl. .................................. 379/93.24; 379/93.12
(58) Field of Search ........................... 379/93.24, 93.12, 379/90.01, 142.01; 705/26

(56) References Cited

U.S. PATENT DOCUMENTS

| | | | |
|---|---|---|---|
| 2002/0016744 A1 * | 2/2002 | Mitsuoka et al. ............. | 705/26 |
| 2002/0095306 A1 * | 7/2002 | Smith et al. ................... | 705/1 |
| 2003/0195697 A1 * | 10/2003 | Jones ........................... | 701/201 |

OTHER PUBLICATIONS

Japanese Patent Abstract No.: 2001-321540 dated Nov. 9, 2001.
Japanese Patent Abstract No.: 2002-024710 dated Jan. 25, 2002.
Japanese Patent Abstract No.: 2002-041735 dated Feb. 8, 2002.

\* cited by examiner

*Primary Examiner*—Stella Woo
(74) *Attorney, Agent, or Firm*—Staas & Halsey LLP

(57) ABSTRACT

A delivery-information management method which enables designation of a reception date and time by easy manipulation of a terminal or the like. Delivery information is recorded in a database. Next, an e-mail containing a scheduled delivery time and a telephone number for confirmation communication is transmitted to an e-mail address included in the delivery information. Thereafter, a telephone call to the telephone number for confirmation communication is received, and an originating telephone number which indicates a number assigned to a telephone line through which the telephone call is made is acquired. When the originating telephone number coincides with the telephone number of a recipient, a flag indicating that the delivery date and time are confirmed is set in the delivery information.

7 Claims, 15 Drawing Sheets

110 DELIVERY-SLIP FILE

| 111 SLIP NUMBER | 112 DELIVERY DATE AND TIME | 113 CONTACT ADDRESS | 114 RECIPIENT'S TELEPHONE NUMBER | 115 CENTER-RECEPTION TELEPHONE NUMBER | 116 RECIPIENT | 117 DESTINATION ADDRESS | 118 CONFIRMATION FLAG |
|---|---|---|---|---|---|---|---|
| 123456 | 7/1 18:00 | Aaa@bbb | 090-1234-5678 | 03-1234-0000 | Yamada, Taro | Chiyoda Ward, Tokyo | UNCONFIRMED |
| 123457 | 7/1 18:00 | Ccc@bbb | 090-4321-8765 | 03-1234-0000 | Suzuki, Hanako | Kita Ward, Osaka City | CONFIRMED |
| 123458 | 7/2 10:00 | Aaa@bbb | 090-1234-5678 | 03-1234-1111 | Yamada, Taro | Chiyoda Ward, Tokyo | UNCONFIRMED |
| ... | ... | ... | ... | ... | ... | ... | ... |

FIG. 5

120 TELEPHONE-NUMBER FILE

| TELEPHONE-LINE IDENTIFICATION CODE (121) | TELEPHONE NUMBER (122) |
|---|---|
| TOKYO DEFAULT NUMBER | 03-1234-0000 |
| TOKYO 1 | 03-1234-1111 |
| TOKYO 2 | 03-1234-2222 |
| TOKYO 3 | 03-1234-3333 |
| TOKYO BLANKET CONFIRMATION NUMBER | 03-1234-9999 |
| OSAKA DEFAULT NUMBER | 06-1234-0000 |
| OSAKA 1 | 06-1234-1111 |
| ⋮ | ⋮ |

FIG. 6

41 COMMUNICATION MESSAGE

Mr. Taro Yamada<br>
<br>
We have a package scheduled to be delivered to you.<br>
<br>
The scheduled delivery date and time are on July 1 at 18:00.<br> ⟵ 41a
<p></p>
<a href=' 'tel:030-1234-0000' '>Acceptable</a><br> ⟵ 41b, 41c
(When pressed, our system is automatically called up.<br>
Please hang up after you hear the first ring.<br>
No telephone charge is made to you.)<br>

<br>
The scheduled delivery date and time are on July 2 at 10:00.<br> ⟵ 41d
<p></p>
<a href=' 'tel:030-1234-1111' '>Acceptable</a><br> ⟵ 41e, 41f
(When pressed, our system is automatically called up.<br>
Please hang up after you hear the first ring.<br>
No telephone charge is made to you.)<br>

<br>
When you agree to all of the above conditions<br>
<p></p>
<a href=' 'tel:030-1234-9999' '>All acceptable</a><br> ⟵ 41g, 41h
<a href=' 'http://www.xxx.co.jp/tko.htm' '>Change</a><br> ⟵ 41i, 41j
(The current screen is changed to a screen for setting changed date and time.)<br>

FIG. 11

DELIVERY-SCHEDULE NOTIFICATION SCREEN 51

Mr. Taro Yamada

We have a package scheduled to be delivered to you. ~51a
The scheduled delivery date and time are 7/1 and 18:00.

Acceptable ~ 51b
(When pressed, our system is automatically called up.
Please hang up after you hear the first ring.
No telephone charge is made to you.)

We have a package scheduled to be delivered to you. ~51c
The scheduled delivery date and time are on July 2 at
10:00.

~ 51d
Acceptable
(When pressed, our system is automatically called up.
Please hang up after you hear the first ring.
No telephone charge is made to you.)

When you agree to all of the above conditions
All acceptable ~ 51e

~ 51f

Change
(The current screen is changed to a screen for setting
changed date and time.)

FIG. 12

70 DELIVERY-SLIP FILE

| INFORMATION IDENTIFYING PACKAGE TO BE DELIVERED | RECIPIENT | DESTINATION ADDRESS | RECIPIENT'S CONTACT ADDRESS | RECIPIENT'S TELEPHONE NUMBER | DELIVERY DATE AND TIME |
|---|---|---|---|---|---|
| 123456 | Yamada, Taro | Chiyoda Ward, Tokyo | Aaa@bbb | 090-1234-5678 | July 1 18:00 |

DELIVERY-INFORMATION MANAGEMENT METHOD AND DELIVERY-INFORMATION MANAGEMENT PROGRAM

BACKGROUND OF THE INVENTION

1) Field of the Invention

The present invention relates to a delivery-information management method and a delivery-information management program for managing information for delivery of packages. In particular, the present invention relates to a delivery-information management method and a delivery-information management program for determining a delivery date and time in accordance with a schedule of a recipient.

2) Description of the Related Art

Currently, a great number of transportation companies are providing home delivery services. In the home delivery services, when a transportation company (i.e., a home delivery company) receives from a sender a package to be home-delivered, the home delivery company delivers the package to the home of the recipient. In many cases, it is necessary to directly deliver packages to recipients or members of the families of the recipients by hand. For example, when acknowledgment of receipt by a recipient himself or herself is required, a package is required to be directly delivered to the recipient by hand. In addition, packages which cannot be put in a private mailbox are also required to be directly delivered to recipients by hand.

However, recipients may be absent when deliverers visit the homes of the recipients. Since the deliverers cannot directly deliver packages to the recipients by hand when the recipients are absent, the deliverers have to temporarily bring back the packages. In these cases, the packages are delivered to the recipients at later dates. That is, the deliverers repeatedly visit the homes of the recipients for delivery of the packages, and the working efficiency is lowered. In addition, since the recipients are not informed of when the packages are delivered, the recipients cannot go out without anxiety.

Therefore, currently, the home delivery companies are providing services for delivering packages at dates and times designated in advance when requested by senders or recipients. For example, the delivery dates and times are designated when the home delivery companies receive the packages from the senders. In these cases, the senders have to spend additional time confirming that the recipients are at home at the designated dates and times. That is, the utilization efficiency of the services is low.

Thus, in order to promote use of the services for delivering packages at designated dates and times, it is necessary to facilitate designation of delivery times by recipients. However, since, generally, the recipients are not informed of delivery of packages in advance, the recipients cannot designate the delivery dates and times in advance. Therefore, systems for notifying recipients of existence of packages to be delivered have been proposed. For example, Japanese Unexamined Patent Publications Nos. 2001-312540 and 2002-24710 disclose techniques for sending information on packages to terminals at delivery destinations by e-mails. It is possible to prompt recipients to designate delivery dates and times by sending the information on the packages to the recipients in advance.

Nevertheless, in order to receive designation of a delivery date and time by the conventional techniques, it is necessary to perform operations for input of information specifying a package (invoice number), input for authentication of the designator as the recipient, and the like. That is, designation of a delivery date and time is not easy.

In addition, if the designation of a delivery date and time is made by telephone, a telephone charge is made to the recipient. Therefore, when the recipient frequently receives delivered packages, expense for telephone becomes an unignorable amount.

As described above, the expense for telephone and the cumbersome procedure imposed on the recipient become disincentives for the recipient to use the service s for delivering packages at designated dates and times. As a result, the home delivery companies cannot reduce the number of revisits for delivery of packages. That is, additional processes and times are required for delivery of packages.

SUMMARY OF THE INVENTION

The present invention is made in view of the above problems, and the object of the present invention is to provide a delivery-information management method and a delivery-information management program which enables designation of a delivery date and time by easy manipulation of a terminal or the like.

In order to accomplish the above object, a delivery-information management method for managing a delivery time of an article to be delivered, by using a computer, is provided. The delivery-information management method is characterized by comprising the steps of: (a) recording a delivery information item in a database when the delivery information item is input, where the delivery information item includes a delivery date and time of an article to be delivered and a telephone number and an e-mail address of a recipient; (b) transmitting an e-mail to the e-mail address, where the e-mail contains the delivery date and time and a telephone number for confirmation communication; (c) receiving a telephone call to the telephone number for confirmation communication, and acquiring an originating telephone number which indicates a number assigned to a telephone line through which the telephone call is made; and (d) setting in the delivery information item a flag indicating that a delivery date and time are confirmed, when the telephone number of the recipient coincides with the originating telephone number.

In addition, in order to accomplish the above object, a delivery-information management program which makes a computer perform processing for managing a delivery time of an article to be delivered is provided. The delivery-information management program is characterized in that the processing comprises the steps of: (a) recording a delivery information item in a database when the delivery information item is input, where the delivery information item includes a delivery date and time of an article to be delivered and a telephone number and an e-mail address of a recipient; (b) transmitting an e-mail to the e-mail address, where the e-mail contains the delivery date and time and a telephone number for confirmation communication; (c) receiving a telephone call to the telephone number for confirmation communication, and acquiring an originating telephone number which indicates a number assigned to a telephone line through which the telephone call is made; and (d) setting in the delivery information item a flag indicating that a delivery date and time are confirmed, when the telephone number of the recipient coincides with the originating telephone number.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 5 is a diagram illustrating an example of a data structure of a delivery-slip file;

FIG. 6 is a diagram illustrating an example of a data structure of a telephone-number file;

FIG. 11 is a diagram illustrating an example of a communication message;

FIG. 12 is a diagram illustrating a delivery-schedule notification screen;

FIG. 15 is a diagram illustrating an example of a data structure of a delivery-instruction message.

DESCRIPTION OF THE PREFERRED EMBODIMENTS

An embodiment of the present invention is explained below with reference to drawings.

First, an outline of the invention which is realized in the embodiment is explained, and thereafter details of the embodiment are explained.

Figure 1:
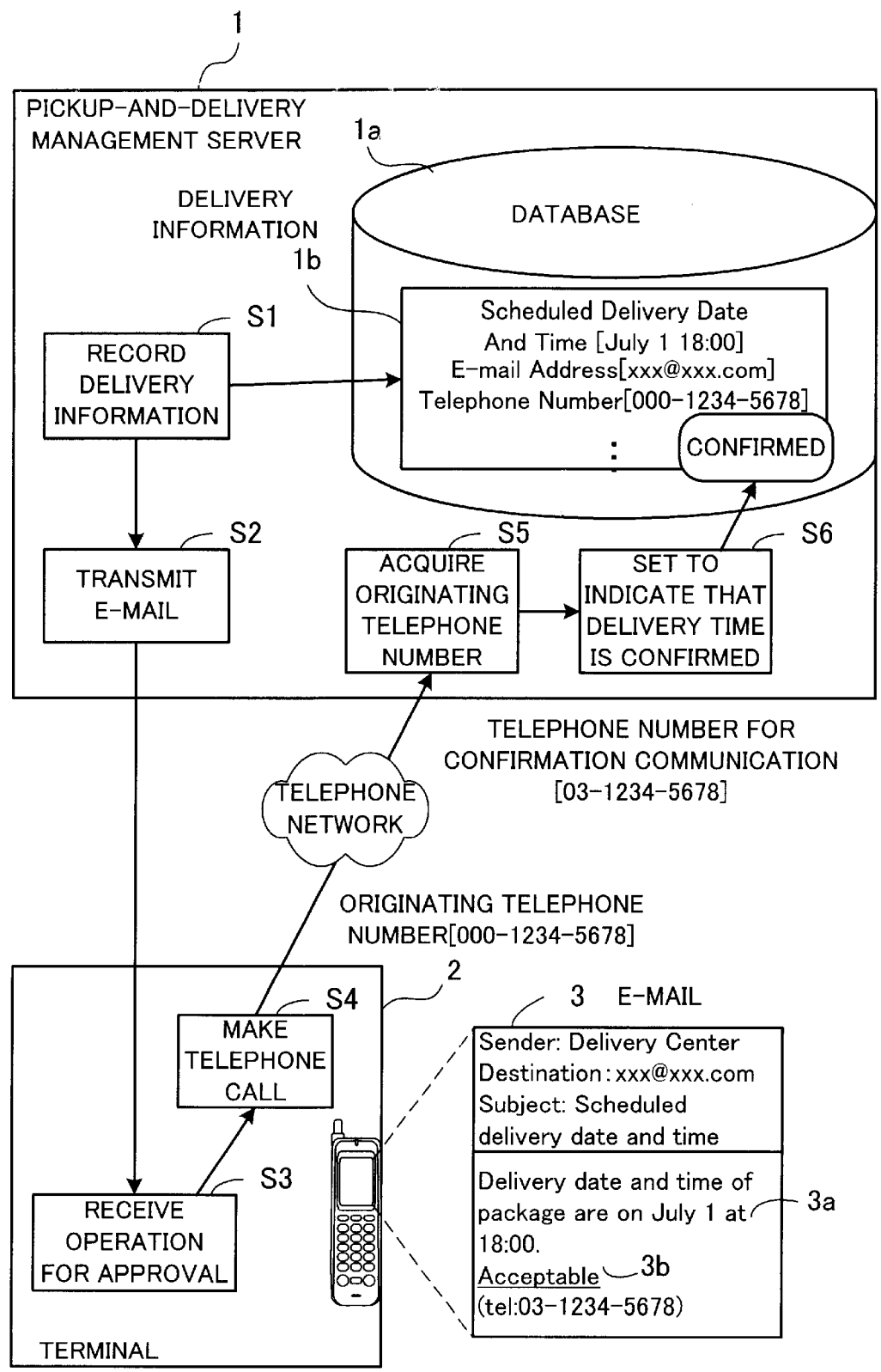
FIG. 1 is a conceptual diagram illustrating the invention which is realized in embodiments.

FIG. 1 is a conceptual diagram illustrating the invention which is realized in embodiments. That is, according to the present invention, the delivery information management method illustrated in FIG. 1 is provided. In the delivery information management method according to the present invention, delivery times of packages to be delivered are managed by using a computer, and the following processing is performed by using the computer.

First, when delivery information 1b including a delivery date and time of a package to be delivered and a telephone number and an e-mail address of a recipient is input, the delivery information 1b is recorded in a database 1a (in step S1). At this time, it is not necessary to concurrently register the entire delivery information 1b in the database 1a. For example, it is possible to set an appropriate date and time as the delivery date and time of the package to be delivered, after information analysis in consideration of a distance to the delivery destination and the like. Next, an e-mail 3 containing the delivery date and time of the package to be delivered and a telephone number for confirmation communication is sent to the e-mail address included in the delivery information 1b (in step S2).

The e-mail 3 is received by a terminal 2 used by the recipient, and displayed on a screen. Then, the terminal 2 receives from the recipient a manipulation input indicating approval of the delivery date and time (in step S3). The terminal 2 has a function of making a telephone call through a telephone line corresponding to the telephone number of the recipient which is included in the delivery information 1b.

For example, the delivery date and time 3a and a hot text 3b (a character string with which a link to another object such as a processing routine in a program is defined) are indicated in the e-mail 3. The hot text 3b is linked to a function of initiating a telephone call to the telephone number for confirmation communication. In this case, the recipient confirms the delivery date and time 3a on the screen. When the recipient is scheduled to be at home at the time, the recipient selects the hot text 3b, where the selection of the hot text 3b is a manipulation for approving the delivery date and time.

When the terminal 2 receives the recipient's manipulation for approving the delivery date and time, the terminal 2 makes (initiates) a call to the telephone number for confirmation communication (in step S4). The terminal 2 may stop the calling operation when the terminal 2 confirms that the call is received by the pickup-and-delivery management server 1.

When the pickup-and-delivery management server 1 receives the call to the telephone number for confirmation communication, the pickup-and-delivery management server 1 acquires the originating telephone number of a telephone line connected to the caller (in step S5). When the delivery information 1b stored in the database 1a includes a telephone number identical to the above originating telephone number, the pickup-and-delivery management server 1 sets a flag in the delivery information 1b (in step S6), where the flag indicates that the delivery date and time have been confirmed.

According to the above delivery-information management method, the recipient is notified of a scheduled delivery date and time and a telephone number for confirmation communication by the e-mail 3. When a telephone call to the telephone number for confirmation communication is made by a recipient's telephone, the pickup-and-delivery management server 1 is set so as to indicate that the delivery date and time are confirmed.

Thus, the pickup-and-delivery management server 1 can receive a notification of approval of the delivery date and time and register the approval in the database 1a without authentication of the recipient. In other words, the user authentication is realized based on the telephone number of the telephone line through which the recipient makes a telephone call, and a procedure for approval of the delivery date and time is realized by the telephone call to the telephone number for confirmation communication (where a one-ring call suffices to realize the procedure). Therefore, it is possible to greatly reduce the time of the recipient spent for notifying the home delivery company of the approval of the delivery date and time.

In addition, what the recipient is required to do is only to make a telephone call to the telephone number for confirmation communication in the pickup-and-delivery management server 1. It is not necessary to speak a word on the telephone line. Therefore, no telephone charge is made to the recipient.

Incidentally, the terminal 2 can be realized by various types of equipment which can receive and display an e-mail, and make a telephone call to the pickup-and-delivery management server 1. For example, a portable telephone can be used as the terminal 2. In this case, even when the recipient is out, the processing for notification of a delivery date and time, approval of the delivery date and time, and the like can be performed. Hereinbelow, details of the embodiment of the present invention are explained. As an example, a case where a portable telephone is used as the terminal 2 is explained below.

Figure 2:
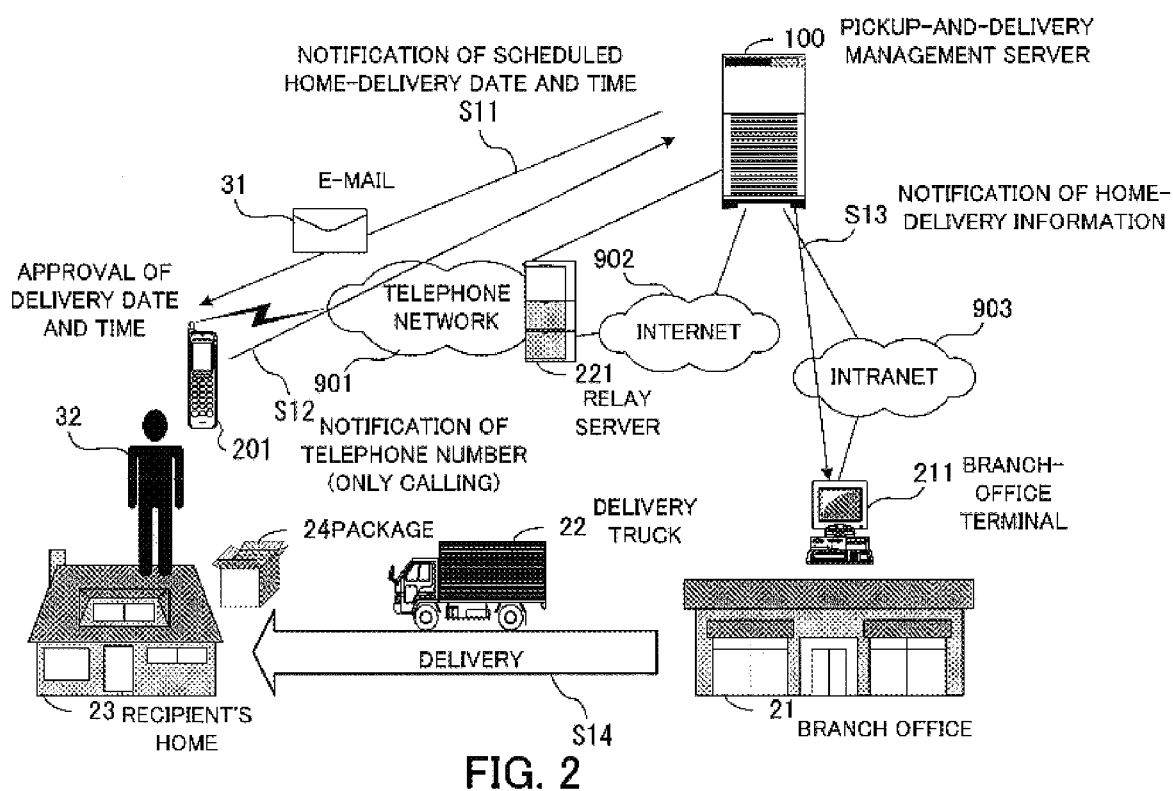
FIG. 2 is a conceptual diagram illustrating examples of operations in a home delivery service in an embodiment of the present invention.

FIG. 2 is a conceptual diagram illustrating examples of operations in a home delivery service in the embodiment of the present invention. As illustrated in FIG. 2, the pickup-and-delivery management server 100 is connected to the telephone network 901, the Internet 902, and the intranet 903.

The telephone network 901 is a communication network through which voice conversation and data communication are carried out by using various telephones. In the present embodiment, a mobile telephone network and a fixed telephone network are integrated in the telephone network 901. For example, a portable telephone 201 and the pickup-and-delivery management server 100 can be connected to the telephone network 901. In addition, the telephone network 901 is connected to the Internet 902 through a relay server 221, which relays packets transmitted between computers connected to the Internet 902 and the portable telephone 201 connected to the telephone network 901.

Various networking devices including the pickup-and-delivery management server 100, the relay server 221, and the like are connected to the Internet 902.

The intranet 903 is a communication network which is used for transmitting information within a home delivery company. A branch-office terminal 211, which is set in a branch office 21 of the home delivery company, is connected to the intranet 903. The branch office 21 has delivery trucks 22, and can deliver a package 24 to a recipient's home 23 by the delivery trucks 22.

In the above system, when the home delivery company receives a request for delivery of the package 24, the home delivery company registers delivery information on the package 24 in the pickup-and-delivery management server 100. The delivery information includes a telephone number and an e-mail address of the portable telephone 201, which is possessed by a recipient 32. The home delivery company transports the package 24 to the branch office 21 which covers an area including the address of the recipient 32.

The pickup-and-delivery management server 100 determines a delivery date and time based on information including the address of the recipient's home 23, the number of the delivery trucks 22 possessed by the branch office 21, and the like. For example, the above delivery date and time may be determined to be an earliest deliverable date and time. Alternatively, the delivery date and time may be set by a manipulation input by a delivery management person or the like in the home delivery company.

When the scheduled delivery date and time are determined, the pickup-and-delivery management server 100 transmits to the e-mail address of the portable telephone 201 an e-mail 31 for notification of the scheduled delivery date and time (in step S11). The e-mail 31 is sent through the relay server 221 to the portable telephone 201 possessed by the recipient 32. The contents of the e-mail 31 have a form of a structured document. In the e-mail 31, a document indicating the scheduled delivery date and time and a character string linked to a telephone number connected to the pickup-and-delivery management server 100 (a sentence for confirmation of the delivery date and time) are included as objects to be displayed. When the portable telephone 201 is located in Japan, it is possible to use an i-mode-compatible HTML (hyper text markup language) document, where "i-mode" is a registered trademark.

The recipient 32 confirms the contents of the e-mail 31 by using the portable telephone 201. When the recipient 32 can be at home on the scheduled delivery date and time, the recipient 32 selects the sentence for confirmation of the delivery date and time by manipulation of the portable telephone 201. Then (in step S12), the portable telephone 201 makes a telephone call to the telephone number linked to the sentence for confirmation of the delivery date and time (i.e., the telephone number connected to the pickup-and-delivery management server 100). Thus, the pickup-and-delivery management server 100 is called by a telephone exchange which manages the telephone network 901, and informed of the telephone number of the portable telephone 201.

The pickup-and-delivery management server 100 does not respond to the call from the portable telephone 201, acquires the telephone number of the portable telephone 201, and sets a flag indicating completion of confirmation in the delivery information containing the telephone number. In addition, the recipient 32 stops the calling operation from the portable telephone 201 (i.e., the recipient 32 hangs up) when the recipient 32 confirms that the pickup-and-delivery management server 100 is called.

The pickup-and-delivery management server 100 transmits through the intranet 903 to the branch-office terminal 211 the delivery information in which the flag indicating the completion of confirmation is set (in step S13). In the branch office 21, the delivery information is confirmed by using the branch-office terminal 211. Then, the branch office 21 delivers the package 24 to the recipient's home 23 by the delivery trucks 22 on time. Thus, the package 24 can be directly delivered to the recipient 32 by hand.

Details of a way to realize the processing indicated in FIG. 2 are explained below.

Figure 3:
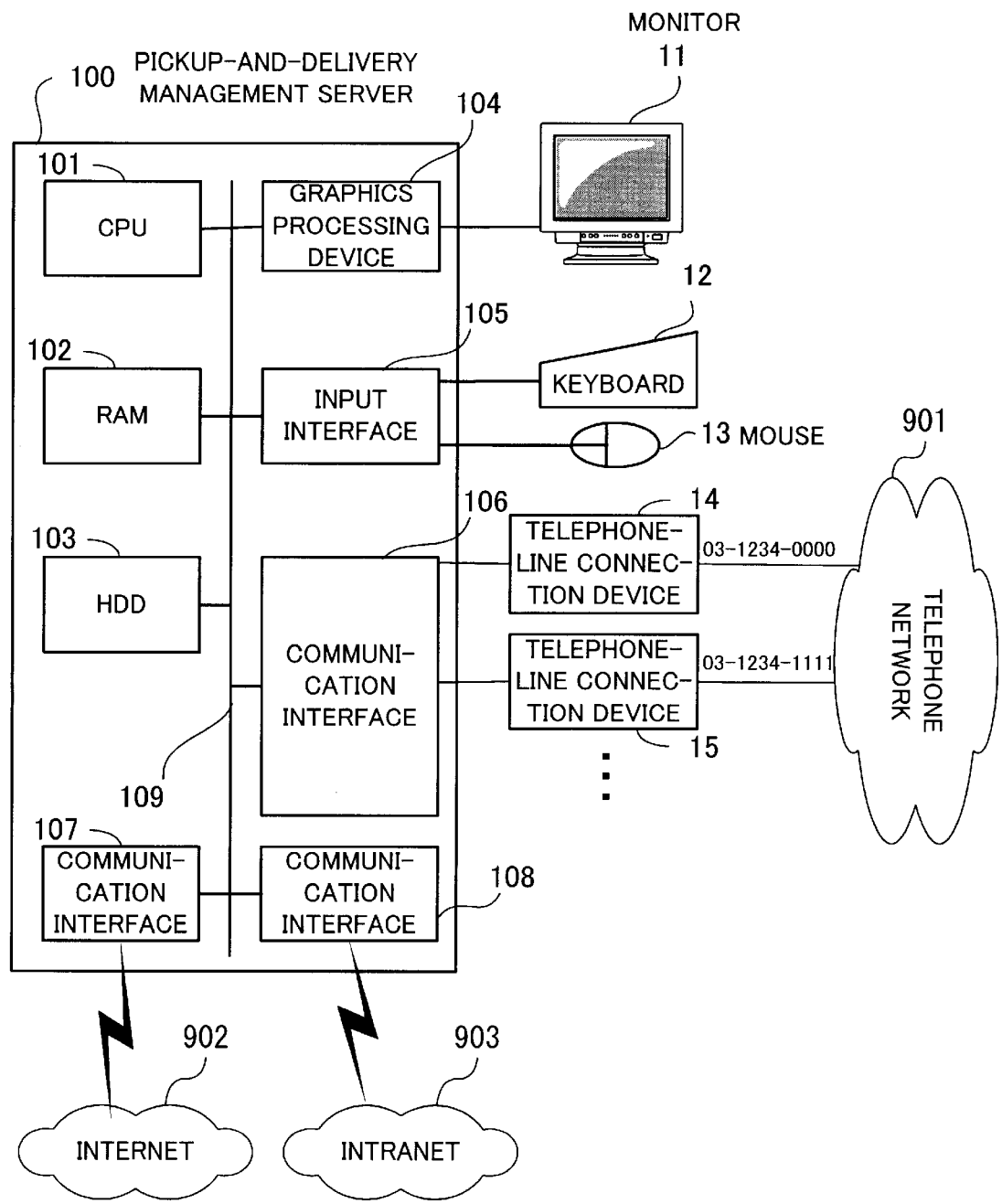
FIG. 3 is a diagram illustrating an example of a hardware construction of a pickup-and-delivery management server used in the embodiment of the present invention.

FIG. 3 is a diagram illustrating an example of a hardware construction of a pickup-and-delivery management server used in the embodiment of the present invention. The CPU (central processing unit) 101 controls the entire pickup-and-delivery management server 100. A RAM (random access memory) 102, an HDD (hard disk drive) 103, a graphics processing device 104, an input interface 105, and a plurality of communication interfaces 106 to 108 are connected to the CPU 101 through the bus 109.

The RAM 102 temporarily stores at least portions of an OS (operating system) program and application programs for execution by the CPU 101. In addition, the RAM 102 stores various data which are necessary for execution by the CPU 101. The HDD 103 stores the OS and the application programs.

A monitor 11 is connected to the graphics processing device 104. The graphics processing device 104 displays an image on a screen of the monitor 11 in accordance with instructions from the CPU 101. A keyboard 12 and a mouse 13 are connected to the input interface 105. The input interface 105 sends through the bus 109 to the CPU 101 signals which are transmitted from the keyboard 12 and the mouse 13.

Telephone-line connection devices 14, 15, . . . are connected to the communication interface 106. The communication interface 106 performs communication with the telephone-line connection devices 14, 15, . . . controls the telephone-line connection devices 14, 15, . . . in accordance with instructions from the CPU 101, and acquires data from the telephone-line connection devices 14, 15, . . . The data acquired from the telephone-line connection devices 14, 15, . . . include, for example, telephone numbers provided by notifications of originating telephone numbers.

The telephone-line connection devices 14, 15, . . . are connected to individual telephone lines of the telephone network 901. In the example of FIG. 3, the telephone number of the telephone line connected to the telephone-line connection device 14 is "03-1234-0000,"and the telephone number of the telephone line connected to the telephone-line connection device 15 is "03-12341111."The telephone-line connection devices 14, 15, . . . can receive telephone calls destined to the telephone numbers assigned to the telephone-line connection devices 14, 15, . . . , and acquire originating telephone numbers which are transmitted from a telephone exchange in the telephone network 901 by an originating-telephone-number notification service, which are provided by telecommunications service providers in various countries.

The telephone-line connection devices 14, 15, . . . may be realized by utilizing, for example, telephone sets having a number-display function (i.e., a function of displaying an originating telephone number in a display portion. When one of the telephone-line connection devices 14, 15, . . . receive a notification of an incoming call, the telephone-line connection device acquires an originating telephone number from the telephone exchange in the telephone network 901, and sends the originating telephone number to the communication interface 106.

The communication interface 107 is connected to the Internet 902. The communication interface 107 transmits and receives data to and from other computers including the relay server 221 through the Internet 902.

The communication interface 108 is connected to the intranet 903. The communication interface 108 transmits and receives data to and from other computers including the branch-office terminal 211 through the intranet 903.

By using the above hardware construction, the processing functions in the present embodiment can be realized. Although only the hardware construction of the pickup-and-delivery management server 100 is illustrated in FIG. 3, the branch-office terminal 211 and the relay server 221 can also be realized by similar hardware constructions.

The portable telephone 201 is a telephone set having an information processing function such as a microcomputer. Specifically, the portable telephone 201 has a function of transmission and reception of e-mails, a function of displaying structured documents (e.g., i-mode-compatible HTML documents), a function of selecting an arbitrary object (e.g., a character string linked to a telephone number) in a structured document, a function of executing processing linked to the selected object (e.g., a function of making a call to a telephone number linked to the selected object), and the like.

Next, the functions which the pickup-and-delivery management server 100 has for realizing the present embodiment are explained.

Figure 4:
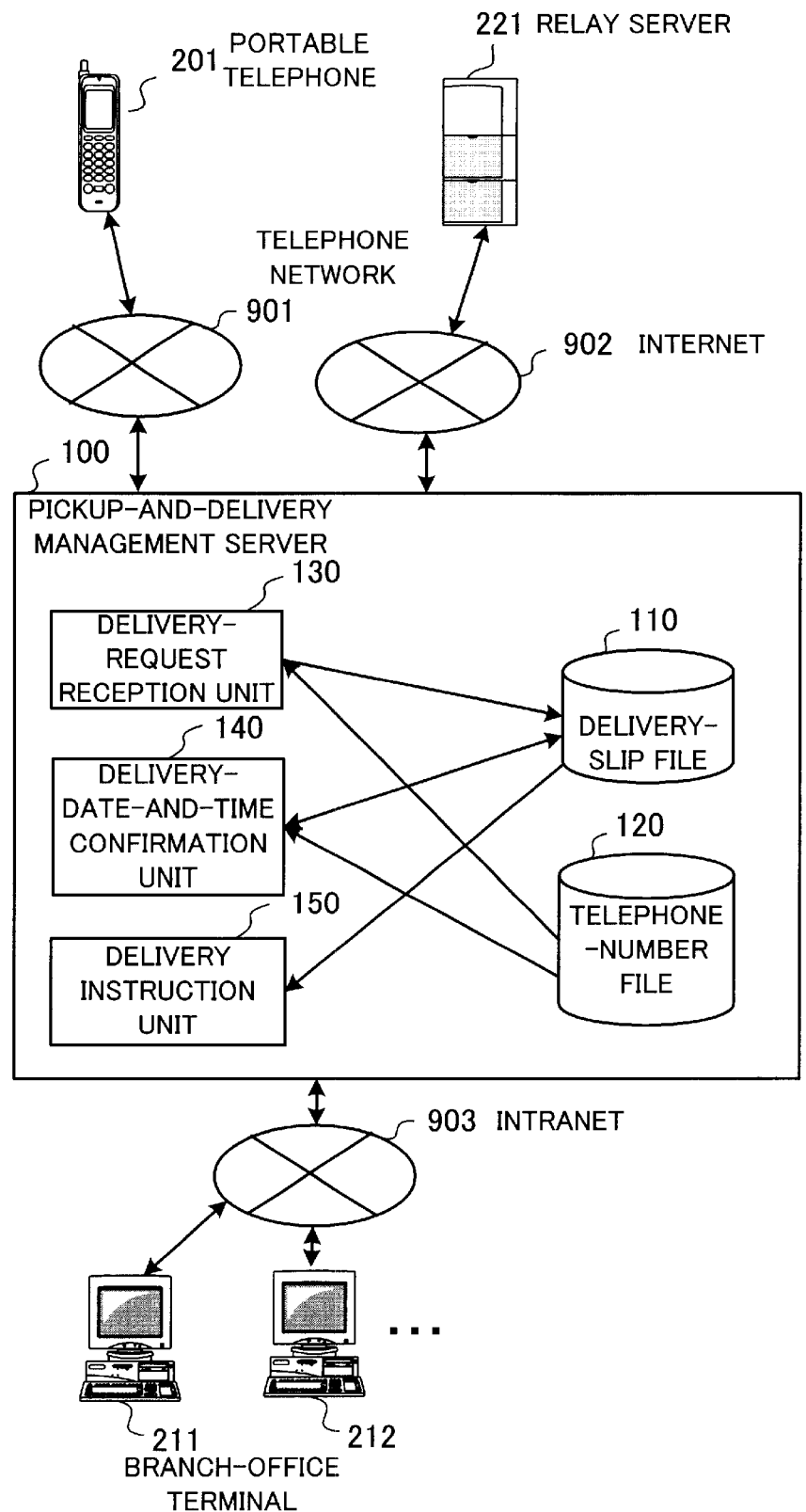
FIG. 4 is a block diagram illustrating functions of the pickup-and-delivery management server.

FIG. 4 is a block diagram illustrating functions of the pickup-and-delivery management server. In the example of FIG. 4, a plurality of branch-office terminals 211, 212, . . . are connected to the intranet 903. In the following explanations, it is assumed that the branch-office terminal 211 is arranged in a branch office 21 which covers an area in which the recipient's home 23 is located, and the branch-office terminal 212 is arranged in a branch office which receives the package 24 from a sender.

The pickup-and-delivery management server 100 comprises a delivery-slip file 110, a telephone-number file 120, a delivery-request reception unit 130, a delivery-date-and-time confirmation unit 140, and a delivery instruction unit 150.

Delivery information on packages for which the pickup-and-delivery management server 100 has received delivery requests is recorded in the delivery-slip file 110. The delivery information includes information on delivery dates and times and flags indicating that recipients have confirmed the delivery dates and times.

Telephone numbers (center-reception telephone numbers) of the telephone-line connection devices 14, 15, . . . connected to the pickup-and-delivery management server 100 are set in the telephone-number file 120. The center-reception telephone numbers are telephone numbers for confirmation communication, i.e., telephone numbers for receiving confirmation communications when the recipients 32 approve delivery dates and times.

The delivery-request reception unit 130 receives delivery information transmitted from the branch-office terminal 212 in the branch office which receives a delivery request for a package 24, and stores the delivery information in the delivery-slip file 110. When a delivery date and time is not set in the delivery information, the delivery-request reception unit 130 sets an earliest deliverable date and time for the destination address as the delivery date and time.

When the delivery-request reception unit 130 receives the delivery information, the delivery-request reception unit 130 refers to the telephone-number file 120, determines a center-reception telephone number, and adds a telephone number for confirmation communication to the delivery information stored in the delivery-slip file 110.

The delivery-date-and-time confirmation unit 140 refers to a delivery information item in which a delivery date and time have not yet been confirmed, among delivery information items which are registered in the delivery-slip file 110, and transmits an e-mail 31 to the portable telephone 201 of the recipient 32 for confirmation of the delivery date and time. In addition, when the delivery-date-and-time confirmation unit 140 receives a telephone call through a telephone line connected to the pickup-and-delivery management server 100, the pickup-and-delivery management server 100 acquires an originating telephone number. When the originating telephone number coincides the telephone number of the portable telephone 201 of the recipient 32, and the center-reception telephone number of the telephone line through which the telephone call is received coincides with an assigned center-reception telephone number, the delivery-date-and-time confirmation unit 140 determines that the delivery date and time of the package 24 addressed to the recipient 32 have been confirmed, and sets in the delivery-slip file 110 a flag indicating that the delivery date and time have been confirmed.

When the center-reception telephone number is a blanket confirmation number (i.e., a telephone number for communication of a blanket confirmation), the delivery-date-and-time confirmation unit 140 sets flags each indicating that delivery date and time are confirmed, in all delivery information items in which the above originating telephone number is registered as the telephone number of the recipient.

The delivery instruction unit 150 refers to the delivery-slip file 110. When the delivery date and time come, the delivery instruction unit 150 transmits the delivery information to the branch-office terminal 211 in the branch office 21 which covers the area including the destination address.

Examples of data structures of the delivery-slip file 110 and the telephone-number file 120 are explained below.

FIG. 5 is a diagram illustrating an example of a data structure of the delivery-slip file. As illustrated in FIG. 5, the delivery-slip file 110 has a "SLIP NUMBER" column 111, a "DELIVERY DATE AND TIME" column 112, a "CONTACT ADDRESS" column 113, a "RECIPIENT'S TELEPHONE NUMBER" column 114, a "CENTER-RECEPTION TELEPHONE NUMBER" column 115, a "RECIPIENT" column 116, a "DESTINATION ADDRESS" column 117, and a "CONFIRMATION FLAG" column 118. The information items in each row in the delivery-slip file are associated with each other.

Identification numbers (slip numbers) for uniquely identifying articles to be delivered are set in the "SLIP NUMBER" column 111.

The delivery dates and times are set in the "DELIVERY DATE AND TIME" column 112. The delivery dates and times are not fixed until they are respectively confirmed by recipients. When the delivery dates and times are respectively confirmed by the recipients, the delivery dates and times in the delivery-slip file become dates and times at which the articles are to be actually delivered.

Contact addresses of the recipients are set in the "CONTACT ADDRESS" column 113. In the present embodiment, e-mail addresses of the recipients which enable e-mail reception by portable telephones are set in the column 113.

Telephone numbers of the recipients are set in the "RECIPIENT'S TELEPHONE NUMBER" column 114. In the present embodiment, telephone numbers of portable telephones possessed by the recipients are set in the column 114.

Telephone numbers on the pickup-and-delivery center side at which communications for confirmation of the delivery dates and times are received are set in the "CENTER-RECEPTION TELEPHONE NUMBER" column 115.

Names of the recipients are set in the "RECIPIENT" column 116.

Addresses of destinations (e.g., the recipients' homes) are set in the "DESTINATION ADDRESS" column 117.

The flags (confirmation flags) respectively indicating whether or not the recipients have confirmed the delivery dates and times are set in the "CONFIRMATION FLAG" column 118. In the example of FIG. 5, the status of each confirmation flag is set to "unconfirmed" when the delivery date and time corresponding to the confirmation flag are not confirmed by the corresponding recipient, and set to "confirmed" when the delivery date and time corresponding to the confirmation flag are confirmed by the corresponding recipient.

FIG. 6 is a diagram illustrating an example of a data structure of the telephone-number file. The telephone-number file 120 has a "TELEPHONE-LINE IDENTIFICATION CODE" column 121 and a "TELEPHONE NUMBER" column 122. The information items in each row in the delivery-slip file are associated with each other.

Identification information (telephone-line identification codes) for the telephone lines which are provided for confirmation of the delivery dates and times is set in the "TELEPHONE-LINE IDENTIFICATION CODE" column 121.

Telephone numbers of the telephone lines which are provided for confirmation of the delivery dates and times (i.e., telephone numbers for confirmation communication) are set in the "TELEPHONE NUMBER" column 122.

The telephone-line identification codes are provided for respective delivery areas. In the example of FIG. 6, telephone-line identification codes for Tokyo and Osaka areas are indicated. In addition, a default number and a blanket confirmation number are provided for each area. The default number for each area is a telephone number used for the first one of packages which are scheduled to be delivered to recipients, and the blanket confirmation number is a telephone number for confirmation communication which is used when delivery dates and times of packages addressed to an identical recipient are approved by one operation.

In the pickup-and-delivery management server 100 having the above construction, a delivery time is determined in accordance with a designation of the recipient 32, and the branch office 21 is notified of the determination. A sequence of processing performed by the pickup-and-delivery management server 100 is explained below.

Figure 7:
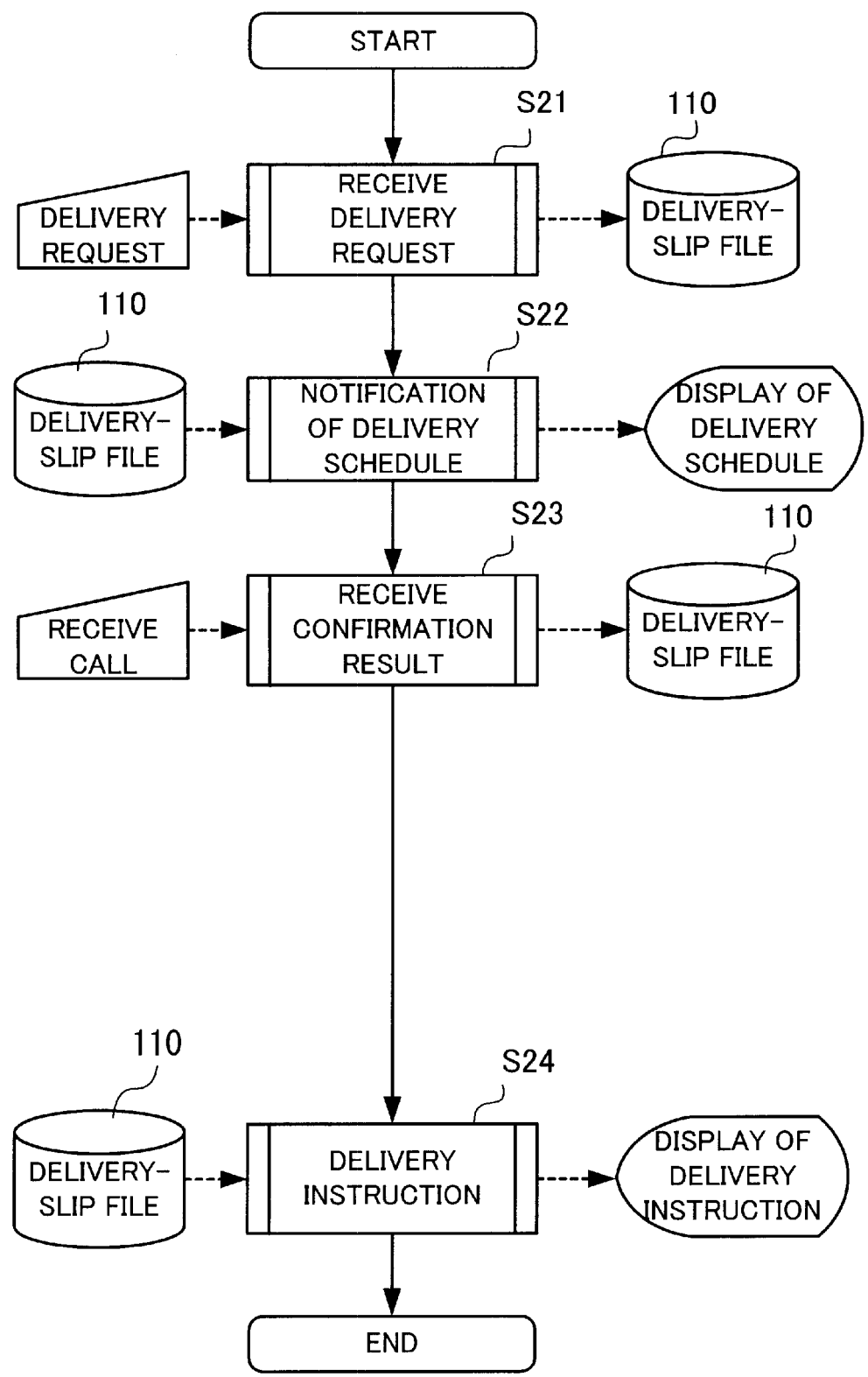
FIG. 7 is a flowchart indicating processing performed by the pickup-and-delivery management server.

FIG. 7 is a flowchart indicating processing performed by the pickup-and-delivery management server. The processing in FIG. 7 is explained below step by step.

[Step S21] The delivery-request reception unit 130 receives a delivery request through the intranet 903 from the branch-office terminal 212 in the branch office which has received the package 24. The delivery-request reception unit 130 registers delivery information corresponding to the received delivery request in the delivery-slip file 110.

[Step S22] The delivery-date-and-time confirmation unit 140 refers to the delivery information registered in the delivery-slip file 110, and sends a delivery schedule to the portable telephone 201 of the recipient 32 by an e-mail 31. Details of the delivery schedule are displayed by a display device in the portable telephone 201.

[Step S23] The delivery-date-and-time confirmation unit 140 acquires a confirmation result when a call from the portable telephone 201 is received. The confirmation result is set in the delivery-slip file 110.

[Step S24] The delivery instruction unit 150 refers to the delivery-slip file 110, and sends a delivery instruction to the branch-office terminal 211 in the branch office 21 which covers the area including the recipient's home 23. Then, details of the delivery instruction are displayed on the branch-office terminal 211.

Details of the processing in each step indicated in FIG. 7 are explained below.

Figure 8:
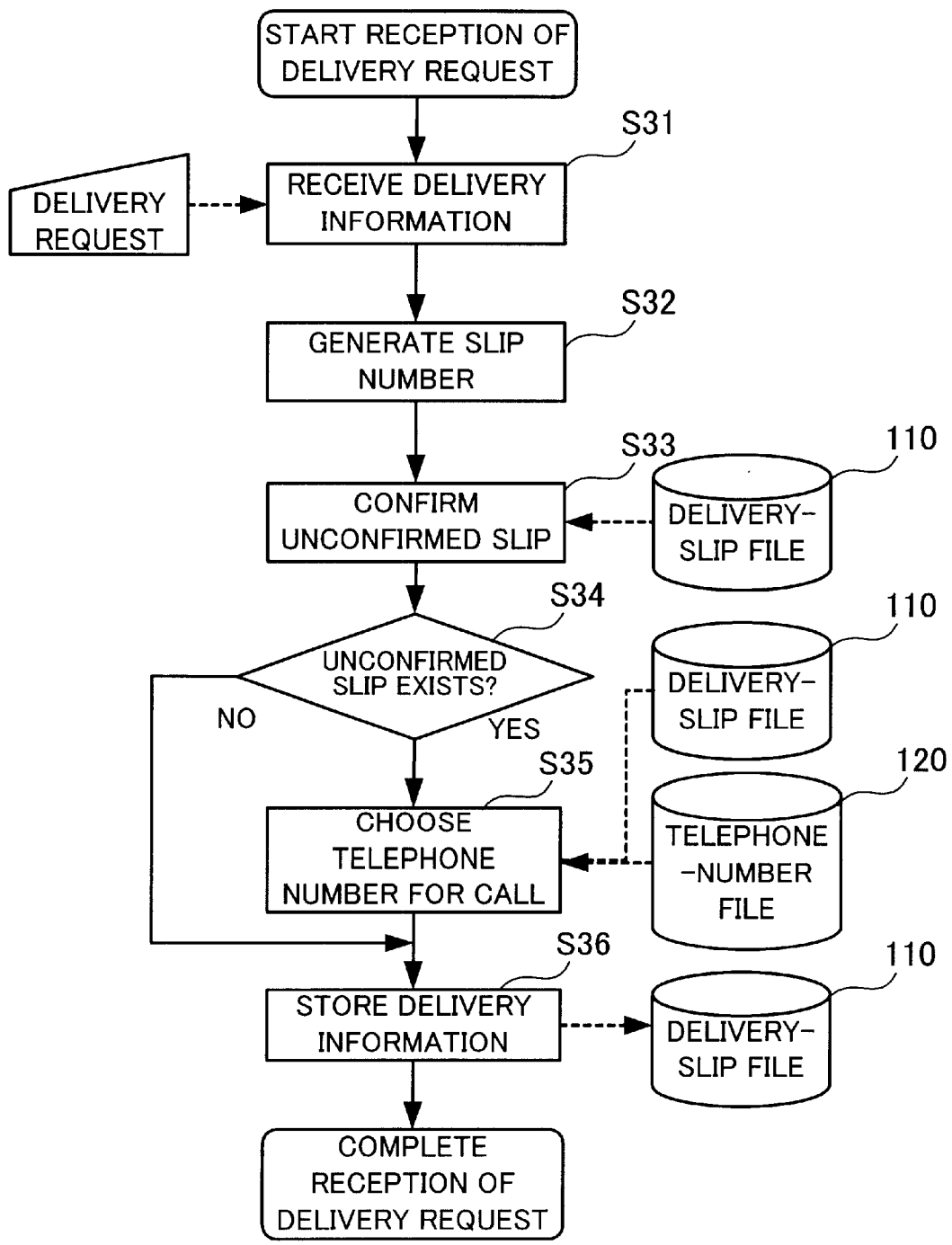
FIG. 8 is a flowchart indicating details of processing for receiving a delivery request.

FIG. 8 is a flowchart indicating details of the processing for receiving a delivery request. The processing in FIG. 8 is explained below step by step.

[Step S31] The delivery-request reception unit 130 receives a delivery request through the intranet 903 from the branch-office terminal 212.

[Step S32] The delivery-request reception unit 130 generates a slip number.

[Step S33] The delivery-request reception unit 130 searches the delivery-slip file 110 for one or more unconfirmed delivery information items including the recipient corresponding to the delivery request received in step S31, where one or more confirmation flags in the one or more unconfirmed delivery information items indicate the "unconfirmed" status.

[Step S34] The delivery-request reception unit 130 determines whether or not one or more unconfirmed delivery information items including the recipient corresponding to the delivery request have been detected. When yes is determined in step S34, the operation goes to step S35. When no is determined in step S34, the operation goes to step S36.

[Step S35] The delivery-request reception unit 130 refers to the delivery-slip file 110 and the telephone-number file 120, and chooses a telephone number of which the recipient is to be notified. Specifically, the delivery-request reception unit 130 chooses an unused telephone number for an area nearest to the address of the recipient (i.e., a telephone number which is not chosen for the one or more unconfirmed delivery information items including the above recipient) from the telephone-number file 120.

[Step S36] The delivery-request reception unit 130 stores the delivery information corresponding to the delivery request in the delivery-slip file 110. In the case where a telephone number is chosen in step S35, the telephone number is set in the "CENTER-RECEPTION TELEPHONE NUMBER" column 115. In the case where the operation of selection in step S35 is not performed, a default telephone number for an area near the recipient's home address is set in the "CENTER-RECEPTION TELEPHONE NUMBER" column 115.

Figure 9:
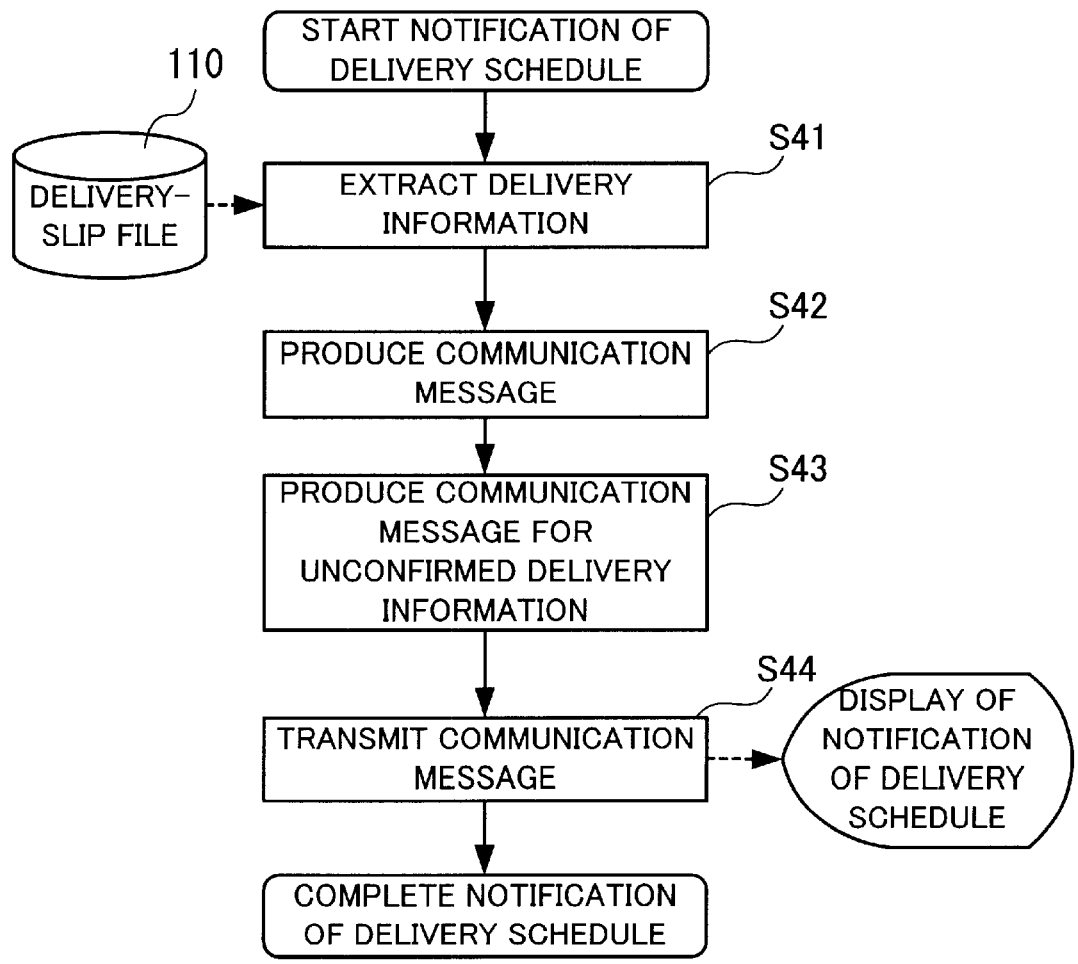
FIG. 9 is a flowchart indicating details of processing for notification of a delivery schedule.

FIG. 9 is a flowchart indicating details of the processing for notification of a delivery schedule. The processing in FIG. 9 is explained below step by step.

[Step S41] The delivery-date-and-time confirmation unit 140 extracts from the delivery-slip file 110 delivery information for an identical recipient.

[Step S42] The delivery-date-and-time confirmation unit 140 produces a communication message indicating a delivery date and time of a package to be delivered, based on the delivery information extracted in step S41.

[Step S43] The delivery-date-and-time confirmation unit 140 produces a communication message for confirmation of a delivery date and time corresponding to an unconfirmed delivery information item (in which a confirmation flag indicates the "unconfirmed" status). The communication message for confirmation of a delivery date and time is formed as a structured document which can be recognized by the portable telephone 201. In this communication message, a center-reception telephone number is linked to a character string which indicates approval of the delivery date and time.

[Step S44] The delivery-date-and-time confirmation unit 140 transmits an e-mail to the portable telephone 201 of the recipient 32, where the e-mail includes the communication messages produced in steps S42 and S43. Thus, a notification of a delivery schedule is displayed on the portable telephone 201.

Figure 10:
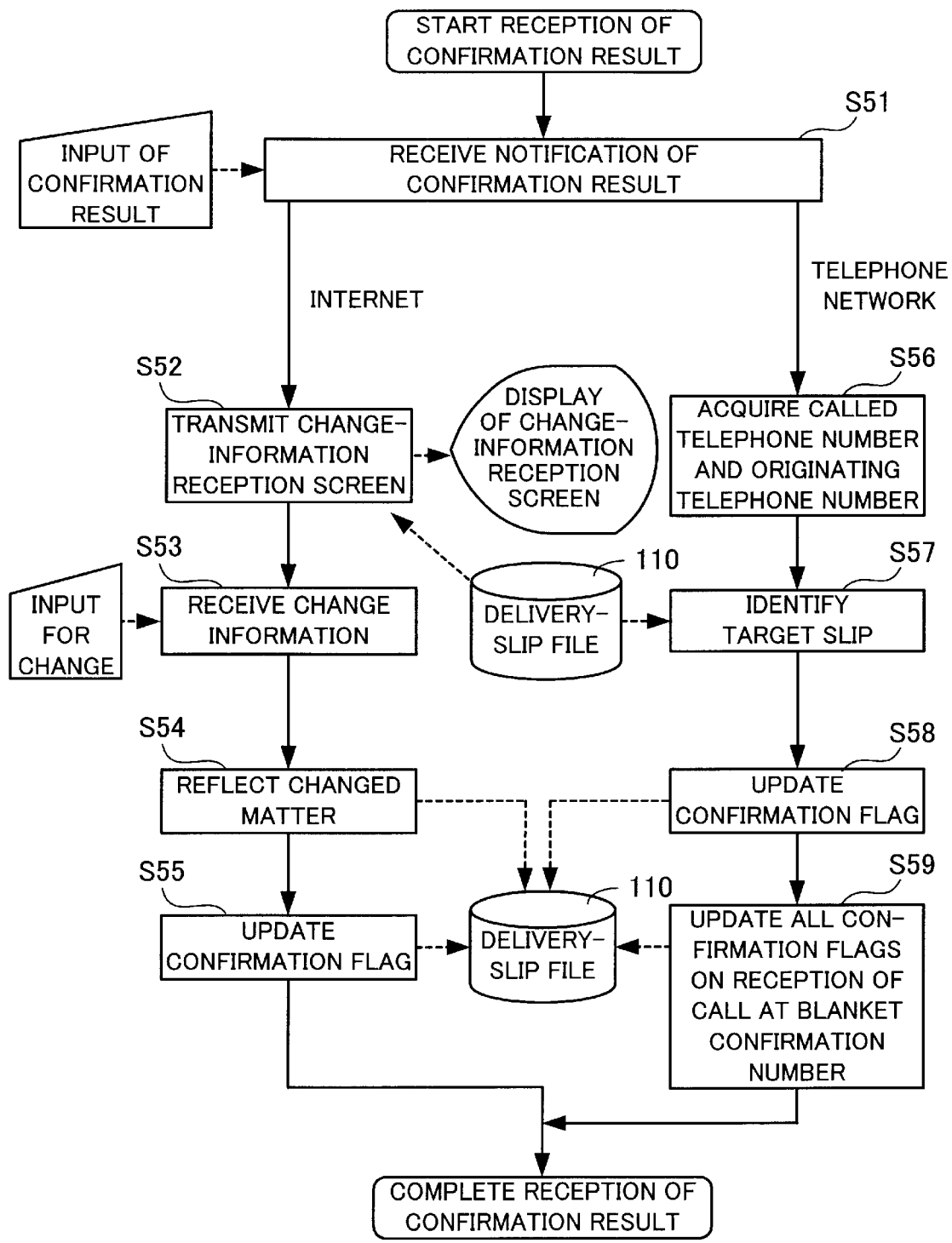
FIG. 10 is a flowchart indicating details of processing for receiving a confirmation result.

FIG. 10 is a flowchart indicating details of the processing for receiving a confirmation result. The processing in FIG. 10 is explained below step by step.

[Step S51] The delivery-date-and-time confirmation unit 140 receives a notification of a result of confirmation of a delivery date and time from the portable telephone 201 of the recipient 32. The following processing is different depending on whether the result of confirmation is received through the Internet 902 or the telephone network 901.

First, the processing (in steps S52 to S55) in the case where the result of confirmation is received through the Internet 902 is explained.

[Step S52] The delivery-date-and-time confirmation unit 140 transmits data of a change-information reception screen to the portable telephone 201. The data of the change-information reception screen is produced as a structured document having a predetermined format, in which an input area for a delivery date and time of an article to be delivered is arranged. Thus, the change-information reception screen is displayed on the portable telephone 201.

[Step S53] When change information is input by the portable telephone 201, the delivery-date-and-time confirmation unit 140 receives the change information.

[Step S54] The delivery-date-and-time confirmation unit 140 updates the delivery-slip file 110 with the change information received through the Internet 902.

[Step S55] The delivery-date-and-time confirmation unit 140 updates the status of a confirmation flag in a delivery information item which is changed according to the change information, to "confirmed." Thus, the processing for receiving a confirmation result is completed.

Next, the processing (in steps S56 to S59) in the case where the result of confirmation is received through the telephone network 901 is explained.

[Step S56] When the pickup-and-delivery management server 100 receives a call from the telephone network 901, the delivery-date-and-time confirmation unit 140 acquires an originating telephone number and a telephone number of a telephone line through which the call is received.

[Step S57] The delivery-date-and-time confirmation unit 140 refers to the delivery-slip file 110, and determines a delivery information item which is to be confirmed. Specifically, the delivery-date-and-time confirmation unit 140 searches the delivery-slip file 110 for a delivery information item including a center-reception telephone number identical to the telephone number of the telephone line through which the call is received, and a recipient's telephone number identical to the originating telephone number. In addition, the delivery-date-and-time confirmation unit 140 determines that the detected delivery information item is the delivery information item which is to be confirmed.

[Step S58] In the case of the individual confirmation of a delivery notification, the delivery-date-and-time confirmation unit 140 updates the status of the confirmation flag in the delivery information item to be confirmed, to "confirmed."

[Step S59] When a call is received at a blanket confirmation number in response to a delivery notification, the delivery-date-and-time confirmation unit 140 updates the status of a confirmation flag in every delivery information item including the above recipient (every delivery information item including the recipient's telephone number identical to the originating telephone number) to "confirmed." Thus, the processing for receiving a confirmation result is completed.

When the above processing is performed by the pickup-and-delivery management server 100, the confirmation flags in the delivery information are updated in accordance with confirmation results.

Hereinbelow, concrete examples of information which is sent from the pickup-and-delivery management server 100 to the portable telephone 201 or the branch-office terminal 211 are explained.

FIG. 11 is a diagram illustrating an example of a communication message. The communication message 41 illustrated in FIG. 11 is generated in HTML, and is a delivery notification for two packages. In the delivery notification, center-reception telephone numbers 41b and 41e and sentences of approval 41c and 41f respectively linked to the center-reception telephone numbers 41b and 41e are displayed under sentences 41a and 41d indicating delivery dates and times of the packages. In the example of FIG. 11, the sentences 41c and 41f each read, "Acceptable."

In addition, a center-reception telephone number 41g for blanket confirmation and a sentence of approval 41h linked to the center-reception telephone number 41g are displayed. In the example of FIG. 11, the sentence of approval 41h reads, "All acceptable." Further, a webpage address (URL: uniform resource locator) 41i for change of a delivery time and a sentence of change request 41j linked to the webpage address 41i are displayed. In the example of FIG. 11, the webpage address 41i indicates a file stored in the HDD 103 in the pickup-and-delivery management server 100, and the sentence 41j reads, "Change."

When the above communication message 41 is sent to the portable telephone 201, a notification of a delivery schedule is displayed on the portable telephone 201.

FIG. 12 is a diagram illustrating a delivery-schedule notification screen. In the delivery-schedule notification screen 51, sentences 5a and 51c indicating delivery dates and times of packages are displayed. Under the sentences 51a and 51c, hot texts of approval 51b and 5d are displayed. The sentence of approval 41c in the communication message 41 is displayed in the hot text 51b, and the sentence of approval 41f in the communication message 41 is displayed in the hot text 51d, where the sentence of approval 41c is linked to the telephone number 41b, and the sentence of approval 41f is linked to the telephone number 41e.

In addition, a hot text of approval 51e for blanket confirmation is displayed in the delivery-schedule notification screen 51, and the sentence of approval 41h in the communication message 41 is displayed in the hot text 51e, which is linked to the telephone number 41g.

When one of the hot texts 51b, 51d, and 51e is selected, a telephone call to a telephone number linked to the selected sentence of approval is made by the portable telephone 201.

In the bottom portion of the delivery-schedule notification screen 51, a hot text of change request 51f is displayed. When the hot text 51f is selected, the portable telephone 201 transmits through the Internet 902 a browsing request designating a webpage address in the communication message 41 which is linked to the hot text 51f.

When the recipient 32 views the delivery-schedule notification screen 51, and agrees to the displayed delivery dates and times of the packages, the recipient 32 selects one or more of the hot texts 51b, 51d, and 51e for approval. For example, when the recipient 32 approves the delivery dates and times of the individual packages, the recipient 32 selects one or both of the hot texts 51b and 51d, each of which reads, "Acceptable." Alternatively, when the recipient 32 approves the delivery dates and times by one operation, the recipient 32 selects the hot text 51e, which reads, "All acceptable."

When one of the hot texts 51b, 51d, and 51e is selected, the portable telephone 201 makes a telephone call to the corresponding telephone number. Then, in the pickup-and-delivery management server 100, the status of a confirmation flag in a delivery information item corresponding to the telephone number is set to "confirmed."

In addition, when the recipient 32 wishes to change the delivery dates and times, the recipient 32 selects the hot text 51f when the hot text 51f is selected, the portable telephone 201 accesses a webpage address. Then, the pickup-and-delivery management server 100 transmits data of a change-information-reception screen to the portable telephone 201, and the change-information-reception screen is displayed on the portable telephone 201.

Figure 13:
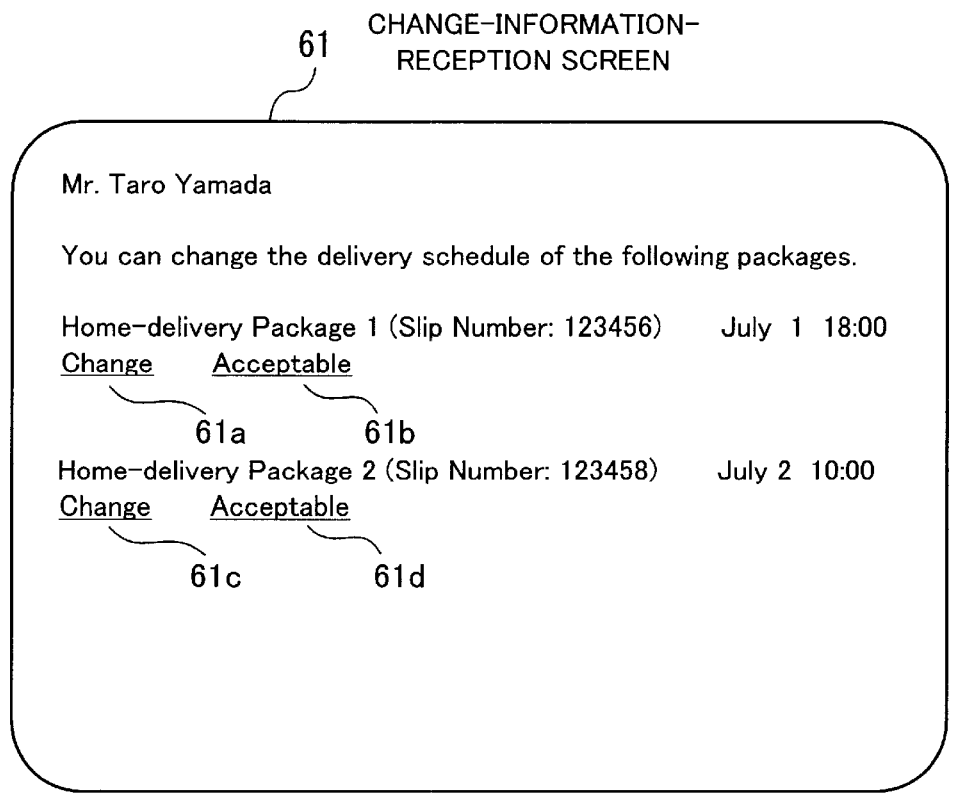
FIG. 13 is a diagram illustrating an example of a change-information-reception screen.

FIG. 13 is a diagram illustrating an example of the change-information-reception screen. As illustrated in FIG. 13, in the change-information-reception screen 61, a slip number and a delivery date and time are displayed for each package to be delivered. In addition, hot texts 61a and 61c for change of delivery dates and times and hot texts 61b and 61d for determination of the delivery dates and times are provided for the respective packages. The hot texts 61a and 61c each read, "Change," and the hot texts 61b and 61d each read, "Acceptable."

When the recipient 32 selects one of the hot texts 61a and 61c, a text for setting a delivery date and time is displayed. When the recipient 32 inputs a desired delivery date and time in a textbox for setting a delivery date and time, the desired delivery date and time are reflected in the change-information-reception screen 61.

When the recipient 32 selects one of the hot texts 61b and 61d in the change-information-reception screen 61, the delivery dates and times of the corresponding package are transmitted to the pickup-and-delivery management server 100, and the delivery-slip file 110 is updated.

When the recipient 32 confirms the delivery dates and times, the pickup-and-delivery management server 100 transmits a delivery instruction to the branch-office terminal 211 in the branch office 21 which delivers the packages.

Figure 14:
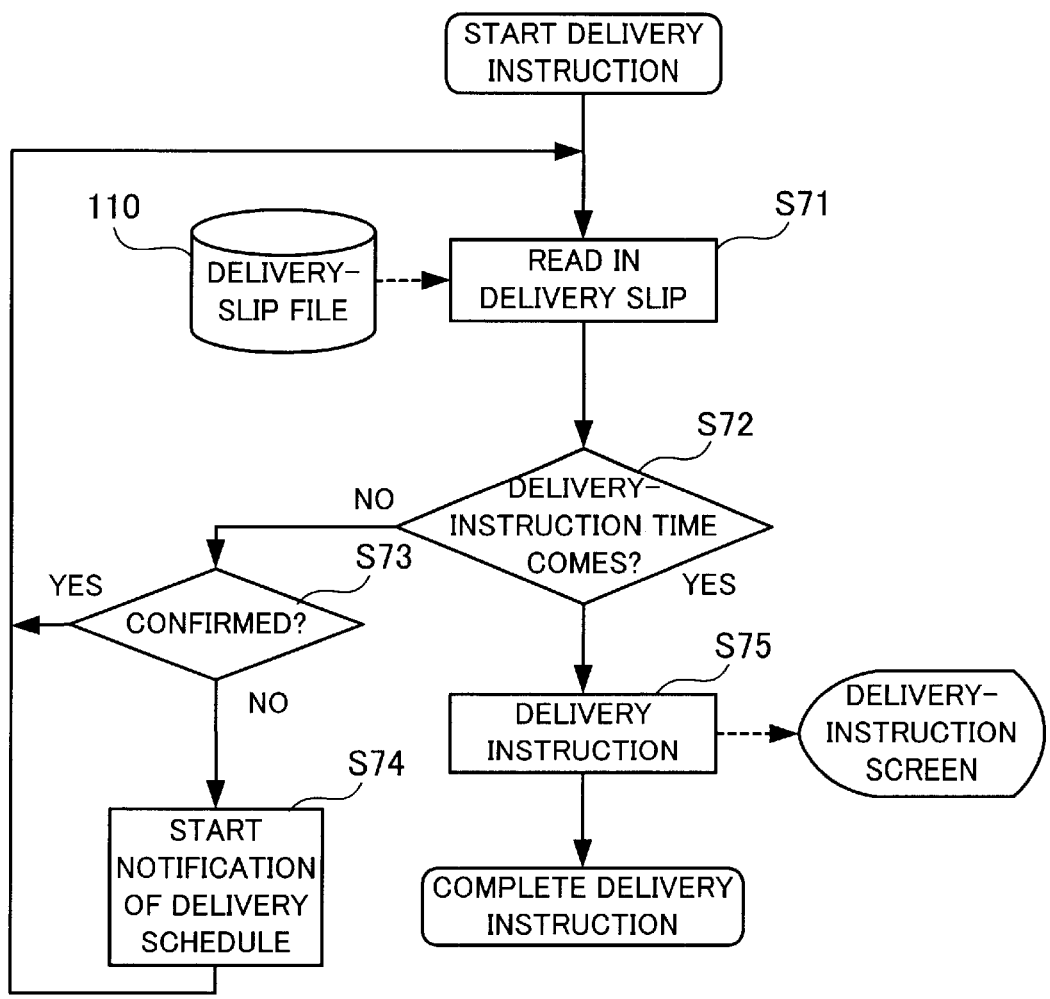
FIG. 14 is a flowchart indicating details of processing for receiving a delivery instruction.

FIG. 14 is a flowchart indicating details of processing for receiving a delivery instruction. The processing in FIG. 14 is explained below step by step.

[Step S71] The delivery instruction unit 150 reads in delivery information from the delivery-slip file 110.

[Step S72] The delivery instruction unit 150 determines whether or not a delivery-instruction time in the delivery information comes. The delivery-instruction time may be, for example, a delivery date in a delivery date and time. When yes is determined in step S72, the operation goes to step S75. When no is determined in step S72, the operation goes to step S73.

[Step S73] The delivery instruction unit 150 determines whether or not the delivery date and time has been confirmed. This determination can be made based on whether or not the confirmation flag in the delivery information is in the "confirmed" status. When yes is determined in step S73, the operation goes to step S71. When no is determined in step S73, the operation goes to step S74.

[Step S74] The delivery instruction unit 150 sends to the delivery-date-and-time confirmation unit 140 a request for commencement of processing for notification of a delivery schedule corresponding to the delivery information.

[Step S75] The delivery instruction unit 150 transmits to the branch-office terminal 211 a delivery-instruction message indicating a delivery instruction. Then, a delivery-instruction screen is displayed on the branch-office terminal 211 for indicating details of the delivery information, and instructing a deliverer in the branch office 21 to deliver.

FIG. 15 is a diagram illustrating an example of a data structure of the delivery-instruction message. The delivery-instruction message 70 includes a slip number 71, a recipient's name 72, a destination address 73, a recipient's contact address 74, a recipient's telephone number 75, and a delivery date and time 76. When the information included in the delivery-instruction message 70 is displayed on the branch-office terminal 211, the deliverer in the branch office 21 can recognize an instruction to deliver the package corresponding to the slip number.

As explained above, in the embodiment of the present invention, the recipient 32 can send to the pickup-anddelivery management server 100 a notification of approval of a delivery date and time by only selecting a hot text on the portable telephone 201. In addition, a predetermined telephone number is only called, and a telephone circuit is not established. Therefore, a telephone charge is not made to the recipient. In other words, the home delivery company can receive from the recipient 32 a notification of confirmation of a delivery date and time without requiring the recipient to perform a bothersome operation, or forcing the recipient to pay a telephone charge.

In addition, the recipient 32 can change the delivery date and time by a simple operation using the portable telephone 201. That is, the recipient 32 is required to only change the value of a delivery time corresponding to a package on the change-information-reception screen, and is not required to manually input user authentication information, a slip number, and the like. Since the operation for the change is easy as explained above, the home delivery company can receive an instruction to change a delivery date and time without imposing a load on the recipient 32.

Further, since the load imposed on the recipient 32 for approval of a delivery date and time and input of information for change of the delivery date and time is reduced, the home delivery company can receive designation of the delivery date and time by the recipient 32 with high reliability. Therefore, it is possible to reduce the number of cases in which recipients are absent at times of delivery, and increase efficiency in the operations for forwarding and direct delivery of packages by hand.

Although, in the above embodiment, the portable telephone 201 is used as a terminal on which the recipient 32 performs operations for approval of a delivery date and time and the like, it is possible to use a fixed telephone set which can receive e-mail, instead of the portable telephone. Further, a personal computer connected to a telephone line may be used as the above terminal used by the recipient 32.

The processing functions of the pickup-and-delivery management server can be realized by a server computer. In this case, a pickup-and-delivery management program which describes details of processing realizing the functions which the pickup-and-delivery management server should have is provided. The server computer executes the pickup-and-delivery management program in response to a request from a client computer. Thus, the above processing functions can be realized on the server computer, and processing results are supplied to the client computer.

The pickup-and-delivery management program describing the details of processing can be stored in a recording medium which is readable by the server computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the pickup-and-delivery management program into the market, for example, it is possible to sell a portable recording medium such as a DVD or a CDROM in which the pickup-and-delivery management program is recorded.

The server computer which executes the pickup-and-delivery management program stores the pickup-and-delivery management program in a storage device belonging to the server computer, where the pickup-and-delivery management program is originally recorded in, for example, a portable recording medium. The server computer reads the pickup-and-delivery management program from the storage device, and performs processing in accordance with the pickup-and-delivery management program. Alternatively, the server computer may directly read the pickup-and-delivery management program from the portable recording medium for performing processing in accordance with the pickup-and-delivery management program.

As explained above, according to the present invention, a recipient is notified of a delivery date and time and a telephone number for confirmation communication by an e-mail, and the status indicating that the delivery date and time are confirmed is set in response to a telephone call from a predetermined telephone line to the telephone number for confirmation communication. Therefore, the recipient can easily perform an operation for approving the delivery date and time.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A delivery-information management method for managing a delivery time of an article to be delivered, by using a computer, comprising the steps of:

(a) recording a delivery information item in a database when the delivery information item is input, where the delivery information item includes a delivery date and time of an article to be delivered and a telephone number and an e-mail address of a recipient;

(b) transmitting an e-mail to said e-mail address, where the e-mail contains said delivery date and time and a telephone number for confirmation communication;

(c) receiving a telephone call to said telephone number for confirmation communication, and acquiring an originating telephone number which indicates a number assigned to a telephone line through which said telephone call is made; and (d) setting in said delivery information item a flag indicating that a delivery date and time are confirmed, when said telephone number of the recipient coincides with said originating telephone number.

2. The delivery-information management method according to claim 1, wherein information in said e-mail has a form of a structured document, and said telephone number for confirmation communication is defined in the e-mail as a target to which a telephone call is to be initiated when the e-mail is displayed and an object in the displayed e-mail is selected.

3. The delivery-information management method according to claim 1, wherein when a plurality of articles to be delivered to said recipient exist, a plurality of different telephone numbers for confirmation communication, which are prepared in advance, are assigned to the plurality of articles, and transmitted by e-mail, and only when a telephone call to one of said plurality of different telephone numbers is received, a flag indicating that a delivery date and time are confirmed is set in said delivery information item including said telephone number of the recipient which coincides with said originating telephone number.

4. The delivery-information management method according to claim 1, wherein when a plurality of articles to be delivered to said recipient exist, a telephone number for communication of blanket confirmation of the plurality of articles is transmitted by e-mail, and when a telephone call to said telephone number for communication of blanket confirmation is received, flags each indicating that a delivery date and time are confirmed are set in all delivery information items including said telephone number of the recipient which coincides with said originating telephone number.

5. A delivery-information management program which makes a computer perform processing for managing a delivery time of an article to be delivered, said processing comprising the steps of:

(a) recording a delivery information item in a database when the delivery information item is input, where the delivery information item includes a delivery date and time of an article to be delivered and a telephone number and an e-mail address of a recipient;

(b) transmitting an e-mail to said e-mail address, where the e-mail contains said delivery date and time and a telephone number for confirmation communication;

(c) receiving a telephone call to said telephone number for confirmation communication, and acquiring an originating telephone number which indicates a number assigned to a telephone line through which said telephone call is made; and (d) setting in said delivery information item a flag indicating that a delivery date and time are confirmed, when said telephone number of the recipient coincides with said originating telephone number.

6. A pickup-and-delivery management server for managing a delivery time of an article to be delivered, comprising:

recording means which records a delivery information item in a database when the delivery information item is input, where the delivery information item includes a delivery date and time of an article to be delivered and a telephone number and an e-mail address of a recipient;

transmitting means which transmits an e-mail to said e-mail address, where the e-mail contains said delivery date and time and a telephone number for confirmation communication;

receiving means which receives a telephone call to said telephone number for confirmation communication, and acquires an originating telephone number which indicates a number assigned to a telephone line through which said telephone call is made; and setting means which sets in said delivery information item a flag indicating that a delivery date and time are confirmed, when said telephone number of the recipient coincides with said originating telephone number.

7. A computer-readable recording medium storing a delivery-information management program which makes a computer perform processing for managing a delivery time of an article to be delivered, said processing comprising the steps of:

(a) recording a delivery information item in a database when the delivery information item is input, where the delivery information item includes a delivery date and time of an article to be delivered and a telephone number and an e-mail address of a recipient;

(b) transmitting an e-mail to said e-mail address, where the e-mail contains said delivery date and time and a telephone number for confirmation communication;

(c) receiving a telephone call to said telephone number for confirmation communication, and acquiring an originating telephone number which indicates a number assigned to a telephone line through which said telephone call is made; and (d) setting in said delivery information item a flag indicating that a delivery date and time are confirmed, when said telephone number of the recipient coincides with said originating telephone number.

* * * * *

UNITED STATES PATENT AND TRADEMARK OFFICE
CERTIFICATE OF CORRECTION

PATENT NO. : 6,690,775 B2
DATED : February 10, 2004
INVENTOR(S) : Michio Okamura It is certified that error appears in the above-identified patent and that said Letters Patent is hereby corrected as shown below:

<u>Title page,</u>
Item [56], References Cited, OTHER PUBLICATIONS
please replace "2001-321540" with -- 2001-312540 --

Signed and Sealed this

First Day of June, 2004

JON W. DUDAS
*Acting Director of the United States Patent and Trademark Office*